Dec. 11, 1928.

R. F. MOREJÓN 1,694,750

PHOTOGRAPHIC CAMERA

Filed May 27, 1926

INVENTOR.
Rafael Fernandez Morejón
BY
ATTORNEY.

Patented Dec. 11, 1928.

1,694,750

UNITED STATES PATENT OFFICE.

RAFAEL FERNANDEZ MOREJON, OF HABANA, CUBA.

PHOTOGRAPHIC CAMERA.

Application filed May 27, 1926, Serial No. 112,100, and in Cuba May 18, 1926.

This invention relates to photographic cameras of the curtain obturator type and of the curtain obturator and reflection mirror type and its object is to provide such types of camera with an automatic exposing mechanism for the curtain obturator so that when the reflecting mirror is thrown to its inoperative position the movement of this mirror will automatically produce the movement of the curtain obturator for causing to pass in front of the plate or film the opening or window previously selected of the curtain obturator.

The invention is described with reference to the figures of the annexed drawings, in which.

Figure 4:
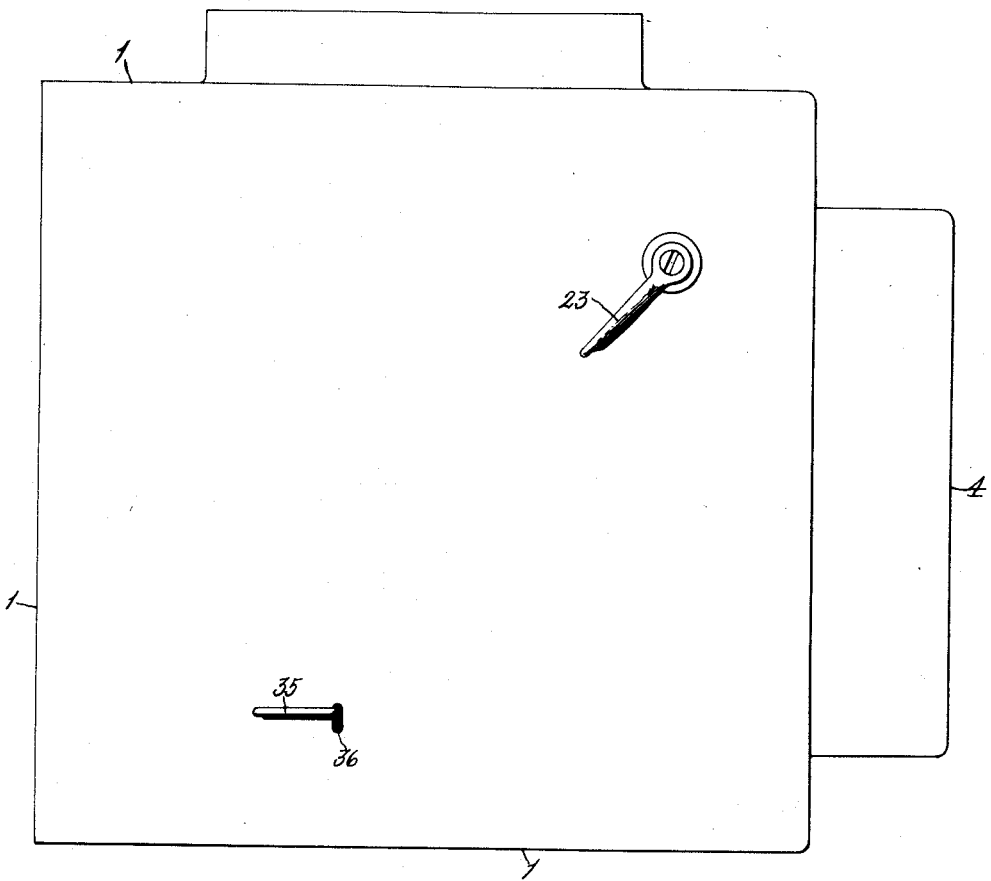

And Fig. 4 is an elevation view by the opposite side of the camera.

In the drawings, 1 indicates a photographic camera of the curtain obturator and reflecting mirror type, whose curtain 2 is provided with openings or windows 3 of different sizes corresponding to the degree of exposition to the light which is to be given to the plate or film arranged vertically in the film-roll holder or plate holder 4, curtain 2 having a winding and unwinding movement respectively on two reels, a lower one 5, and an upper one 6, whose horizontal shafts 7 and 8 are mounted on the side walls of the camera, the lower reel 5 being provided with an automatic winding device by means of a coil spring 9, whose tension is regulated by means of a button 9' annexed to shaft 7, there being fixed on this shaft a ratchet wheel of one single tooth 7' designed to cooperate with the lower catch 10 for holding the reel 5, and another single tooth wheel 7'' designed to engage each one of the spaced teeth of a recording disc 11 marking tension degrees of spring 9'; wheels 7' and 7'' being rotatorily supported on the inner vertical mounting 12, the lever catch 10 being operated by means of a handle T passing through slot 14 at the side or lateral wall of camera 1, and a number of the recorder 11 being visible through opening 15 of the same side of camera 1. 16 indicates the front extension of chamber 1, which is provided with lens 17 and is slidable by means of the mechanism of pinion 18 and rack 18' which is operated by outer button 13, the extension 16 being connected to the body of chamber 1 by means of the accordion connection 19; and 20 indicates the curved slot formed on the side walls of casing 1 and which marks the path to be run by the reflecting mirror 21 pivoted on 22 through the sides or lateral walls of camera 1, pivot 22 terminating at one of its ends in an operating hand arm 23, mirror 21 being connected at its free end to a fixed point 24 of camera 1 by means of a coil spring 25 which is curved or bent on a guide roller 26 rotatorily mounted by means of a horizontal short shaft on the adjacent side wall of camera 1, mirror 21 having at the center of its lower edge a hook catch 27 projecting down for cooperating with a pawl 28 which moves through a hole in a small plate of angular shape 29 held at the center of camera 1 by means of a horizontal supporting plate 30 connected to the back of camera 1 and which serves as resting butt to mirror 21 in its operative position, and said pawl 28 is articulated to an arm 31 which is connected by a coil spring 31' to plate 29 and is integral with the end of a horizontal shaft 32 rotatorily mounted on a supporting piece 33 annexed to the angular plate 29 and which terminates in another arm 34 whose angularly bent end 35 passes through a short vertical slot 36 formed in the opposed wall of camera 1 and which slot limits the movement in opposite directions of pawl 28. 37 and 38 indicate two small rollers of horizontal shaft mounted by one end on the vertical mounting 12 and by the other end on the opposite side wall of chamber 1 for producing the stretching of the curtain 2, and 51 indicates the glass arranged on the upper part of casing 1 for centering the image reflected by mirror 21.

The above description corresponds to what is known up to now of the said photographic cameras of the types of curtain obturator and of the type of curtain obturator with reflecting mirror, but the hereinafter description corresponds to the novelty which forms the subject matter of this invention and which comprises an automatic exposing mechanism for the curtain obturator.

Figure 3:
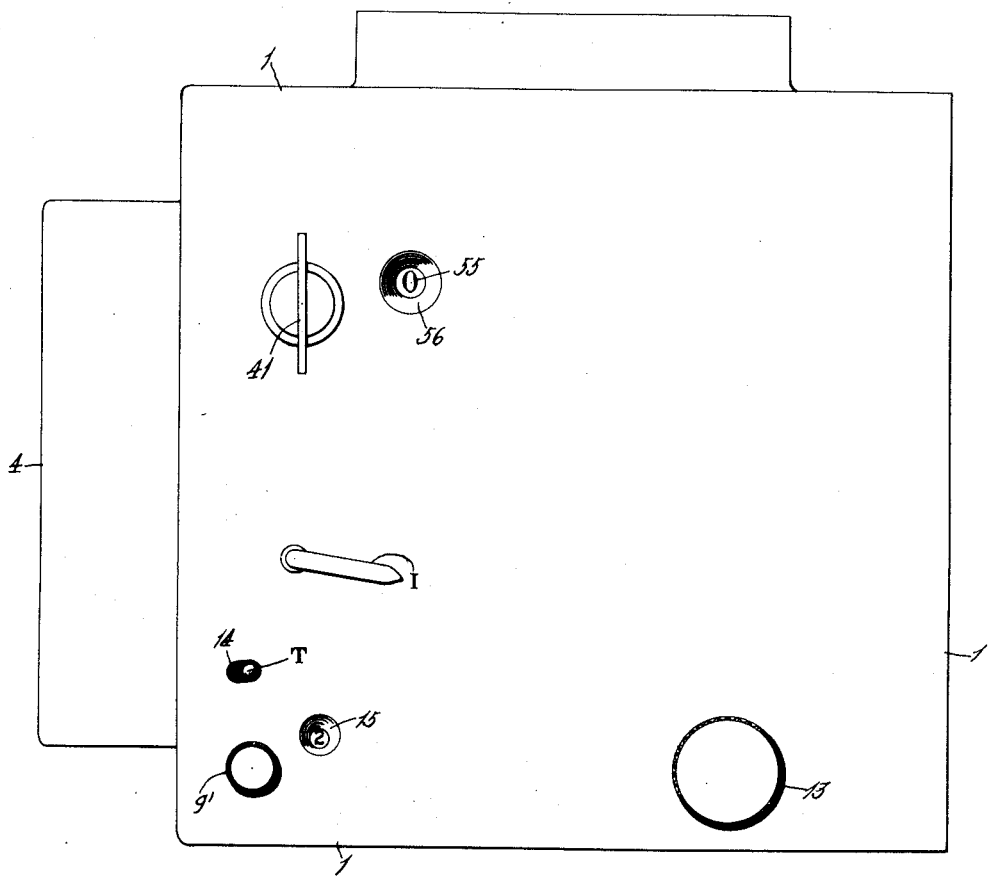
Fig. 3 is an elevation of one side of the photographic camera.

Shaft 7 of the upper winding reel 5 has fixed at its end in front of the vertical mounting 12 a gear pinion B which meshes with a vertical gear wheel 39 whose thick shaft A is rotatorily mounted through an opening 40 at the side wall of camera 1 and terminates outside of this wall in a hand key 41, and said gear wheel 39 has on its outer face two opposite diametral projections a and a', one of which, a, is designed to get in contact with an angular cut recess 42 formed at the upper end of an arm C which at its lower end is pivotally mounted on a butt screw 43 fixed to vertical mounting 12, and the other projection a' is designed to be inserted in a side recess 44 formed near the upper end of another arm D mounted in symmetrical position to arm C with respect to gear wheel 39, on a pivot formed by a butt screw 45 fixed to vertical mounting 12. About the middle point of arm C there is fixed thereto by a butt screw 46 an arm E which terminates like a fork at its opposite end directed towards arm D and the slot 47 of said arm E acts as a butt against a pin d projecting from the outer face of arm D; arms C and D being connected at its lower half by means of a coil spring J which tends to connect them together, and below spring J arm C is connected to a fixed point 48 of the side wall of camera 1 located farther beyond arm D by means of another coil spring K, there being cooperating also with arm D an eccentric wheel F of horizontal shaft 49 rotatorily supported on vertical mounting 12 and passing through a hole 50 in the side wall of camera 1, beyond which hole 50 shaft 49 terminates in an arm I laterally extended on the outer face of side wall of camera 1 (Fig. 3 of the drawings). Arm C has at the upper third part of its length a pin c which is inserted through an elongated slot 52 formed at one end of a link H which at its other end is articulated by a butt screw 53 to the lower end of mirror 21. With gear wheel 39 meshes another gear wheel G rotatorily mounted on a butt screw 54 fixed to the outer face of vertical mounting 12, and at the outer face of this wheel G are marked properly spaced apart the index 55 which indicates the passes of the windows or openings of different sizes of curtain 2, one of which index, the one which is nearer the meshing point of the gear wheels 39 and C, is visible from outside through a beveled opening 56 formed through the side wall of camera 1.

The operation of the exposure mechanism of curtain 2 is as follows: First is regulated the tension of the coil spring 9 according to the speed to which the curtain is desired to pass in front of the back of camera 1, to which effect is turned by hand the button 9' until appearing through the window 15 the number of the recorder 11 corresponding to the desired tension, and then the mirror 21 is lowered to its lower position, operating by hand the handle 23. Then the curtain 2 is wound up in the upper reel 6 until placing same in the proper exposure position according to window 3 of curtain 2 which is desired to pass through the back of camera 1 according to the time of light exposure that may be desired for the plate or film 4; and for the purpose, the gear wheel 39 will be turned by means of the hand key 41, in opposite direction to that indicated by the arrow marked on the gear wheel 39, until there may be visible through window 56 the index 55 marked on the gear wheel G indicating the predetermined opening of curtain 2; on terminating this movement, the pawl a will come to bear on the angular recess 42 of arm C, the mechanism being then in condition for exposure, at the same time that the pawl a' will be released from the side recess 44 of arm D. After properly centering the image, the reflecting mirror 21 is turned back to its normal position indicated by dotted lines in Fig. 1 until getting in contact with the fixed butt 57 connected to a wall of casing 1, to which effect it is only required to move with the hand the end 35 of arm 34, thereby separating pawl 28 of the hook catch 27 and the mirror 21 ascends owing to the tension of the coil spring 25, and in this movement the link H connected to mirror 21 is carried up and forward running in the slot 52 on pin c until, when the latter reaches the end of slot 52, the pin c is carried farther ahead and with the same the arm C which rocks on its lower pivot 43 and releases pawl a. When this movement is effected, arm E releases butt d, but owing to the tension of the spring J, the arm D follows the movement of arm H so that on rotating the wheel 39 in the direction indicated by the arrow in Fig. 1 owing to the tension of spring 9, the pawl a released by arm C will come to be inserted in the groove 44 of arm D and the curtain will be stopped, but in that downward movement of the curtain the previously selected window 3 will have passed in front of the illuminated back of camera 1.

When mirror 21 comes down for placing the mechanism in condition for effecting another operation of curtain 2, the link H releases arm C, which being pulled by the coil spring K turns back to its original position, pawl a remaining on top of groove 42 of arm C at the time that the other pawl a' is released from side groove 44 of arm D, owing to the pushing of the forked arm E on pin d of said arm D.

Figure 1:
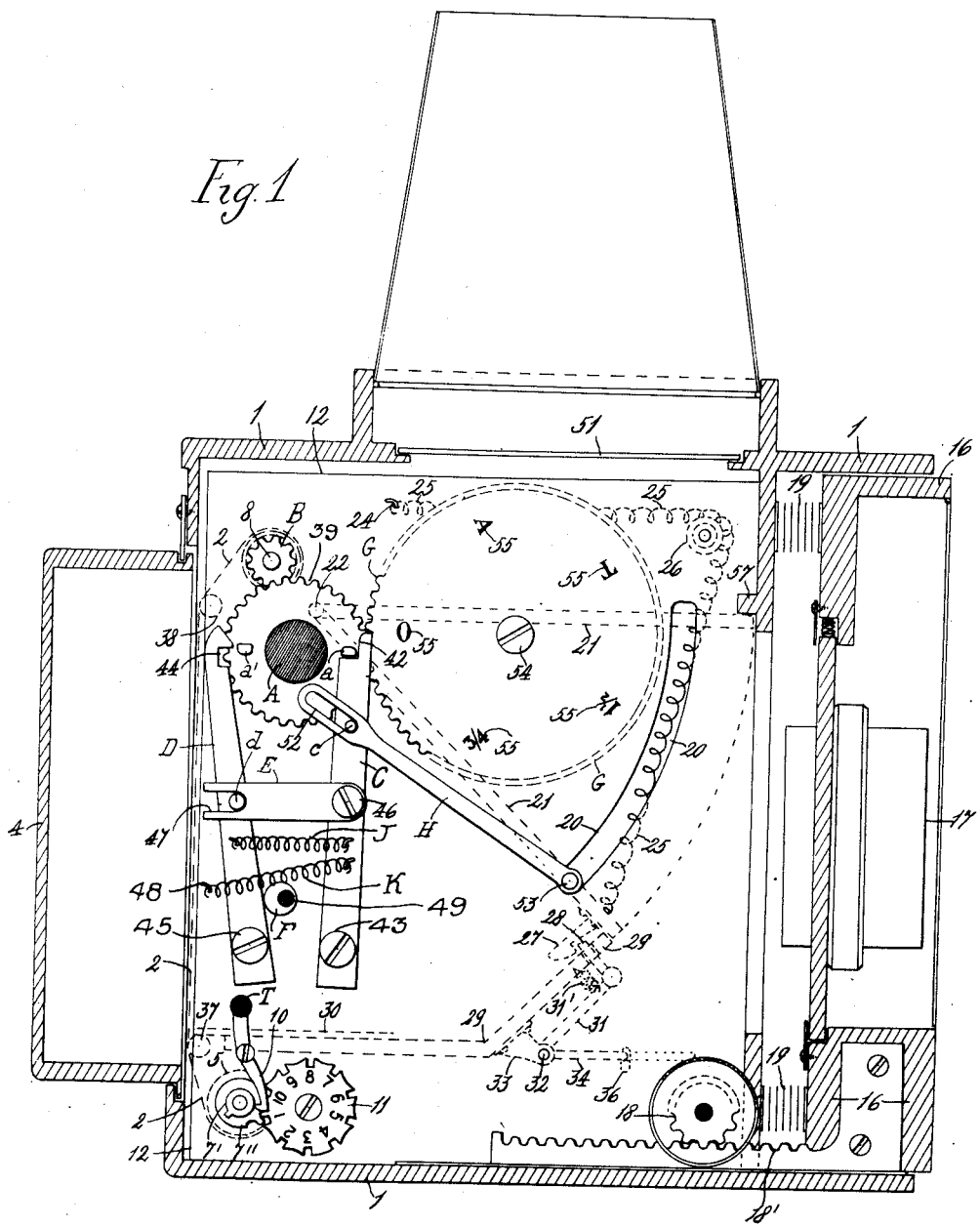
Fig. 1 is a longitudinal vertical section of a photographic camera provided with the improvements forming the subject matter of this invention, with the side wall of the chamber which is adjacent the exposing mechanism of the curtain obturator removed.
Figure 2:
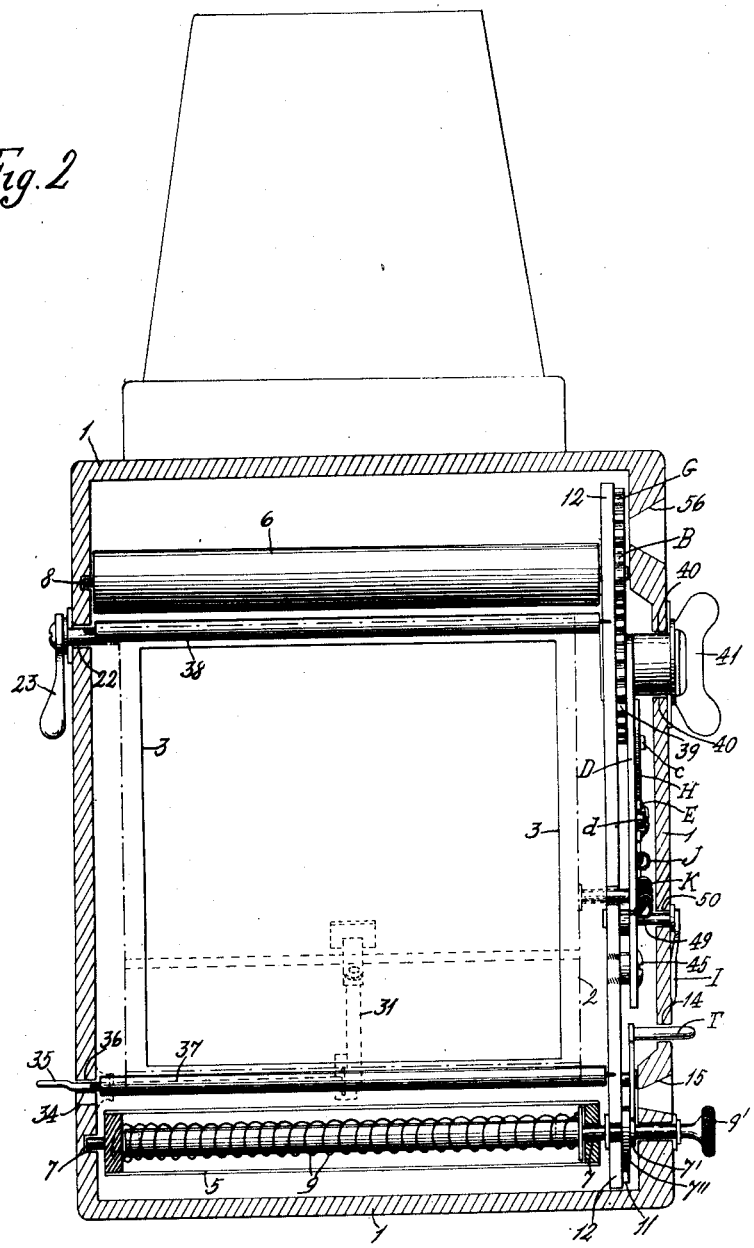
Fig. 2 is a rear elevation of the photographic camera with the back of the camera taken off.

When it is desired that the curtain 2 should freely run instantaneously, then the shaft 49 of eccentric F is operated by means of arm I so that the most projecting portion of the eccentric F may come in contact with the side of arm D, Fig. 1, whereby the side slot 44 of arm D will be withdrawn from the course of pawls a or a' and the wheel 39 will turn freely when the lever catch 10 be operated for releasing the tooth of the ratchet wheel 7' connected to the lower reel 5 on which is wound up the curtain 2.

It should be understood that the form and number of the different pieces which form the curtain operating mechanism can vary without altering the essential spirit of the invention which is as claimed in the appended claims.

What I claim is:—

1. In a photographic camera, an automatic exposing mechanism comprising a curtain, winding reels for the curtain, a gear wheel rotatorily supported at a side of the camera and having two projections in diametral substantially opposite position, a pair of arms rockingly mounted in symmetrical position at opposite sides of the gear wheel and having opposite grooves designed to respectively engage the projections on the gear wheel, a gear pinion fixed at the end of one of said winding reels and meshing with the gear wheel, elastic means connecting together the said first mentioned arms, a reflecting mirror pivotally mounted, and a link of sliding connection which connects one of said arms to the reflecting mirror.

2. In a photographic camera, an automatic exposing mechanism comprising a curtain having several openings, winding reels for the curtain, a gear wheel rotatorily supported at a side of the camera and having two projections in diametral substantially opposite position, a pair of arms rockingly mounted in symmetrical position at opposite sides of the gear wheel and having opposite grooves designed to respectively engage the projections on the gear wheel, a gear pinion fixed at the end of one of the curtain winding reels and meshing with the gear wheel, elastic means connecting together said arms, another gear wheel meshing with the first mentioned gear wheel and carrying at its outer face a plurality of indices indicating the dimensions of the different openings of the curtain, a reflecting mirror pivotally mounted and a sliding connection link which connects one of the said arms to the reflecting mirror.

3. In a photographic camera, an automatic exposing mechanism comprising a curtain, upper and lower winding reels for the curtain, a gear wheel rotatorily supported at a side of the camera and having two projections in diametral substantially opposite position, a pair of arms rockingly mounted in symmetrical position at opposite sides of the gear wheel and having at its upper end opposite grooves designed to respectively engage the two projections on the gear wheel, a gear pinion fixed at the end of the upper winding reel and meshing with the gear wheel, a transverse arm pivotally connected to one of the first mentioned arms and having at its free end a slot which acts as a butt against a pin projecting from the other arm, a coil spring connecting together the symmetrical arms, a reflecting mirror pivotally mounted, a link connected at one end by groove and pin to that of the first mentioned arms which is pivotally connected to the transverse arm and pivotally connected at the other end to the reflecting mirror, and a coil spring connecting the first mentioned arm which is pivotally connected to the transverse arm to a fixed point of the camera which is located farther beyond the other first mentioned arm.

4. In a photographic camera, an automatic exposing mechanism comprising a curtain having several spaced openings, upper and lower winding reels for the curtain, a gear wheel rotatorily supported at a side of the camera and having two projections in diametral substantially opposite position, a pair of arms rockingly mounted in symmetrical position at opposite sides of the gear wheel, one of said arms having at its upper end an angular cut and the other arm having a recess at its inner side, the cut and recess of said arms being respectively designed to engage the projections on the gear wheel, an operating key on the projecting end of the shaft of the gear wheel, a gear pinion fixed at one end of the upper winding reel, a second gear wheel meshing with the first gear wheel and having at its outer face a plurality of indices spaced apart indicating the dimensions of the several openings of the curtain, one of such indices being visible from the outside of the camera through an opening in the side of the same, a transverse arm pivotally connected to one of the first mentioned arms and having at its free end a recess inside which acts as a butt against a pin projecting from the other arm, a coil spring connecting together the symmetrical arms, a reflecting mirror pivotally mounted, a link connected at one end by groove and pin to that of the symmetrical arms which is pivotally connected to the transverse arm and pivotally connected at the other end at a side of the reflecting mirror, and a coil spring connecting the first mentioned arm which is pivotally connected to the transverse arm to a fixed point of the camera located against the other first mentioned arm.

In witness whereof I affix my signature.

RAFAEL FERNANDEZ MOREJON.